Figure 1:
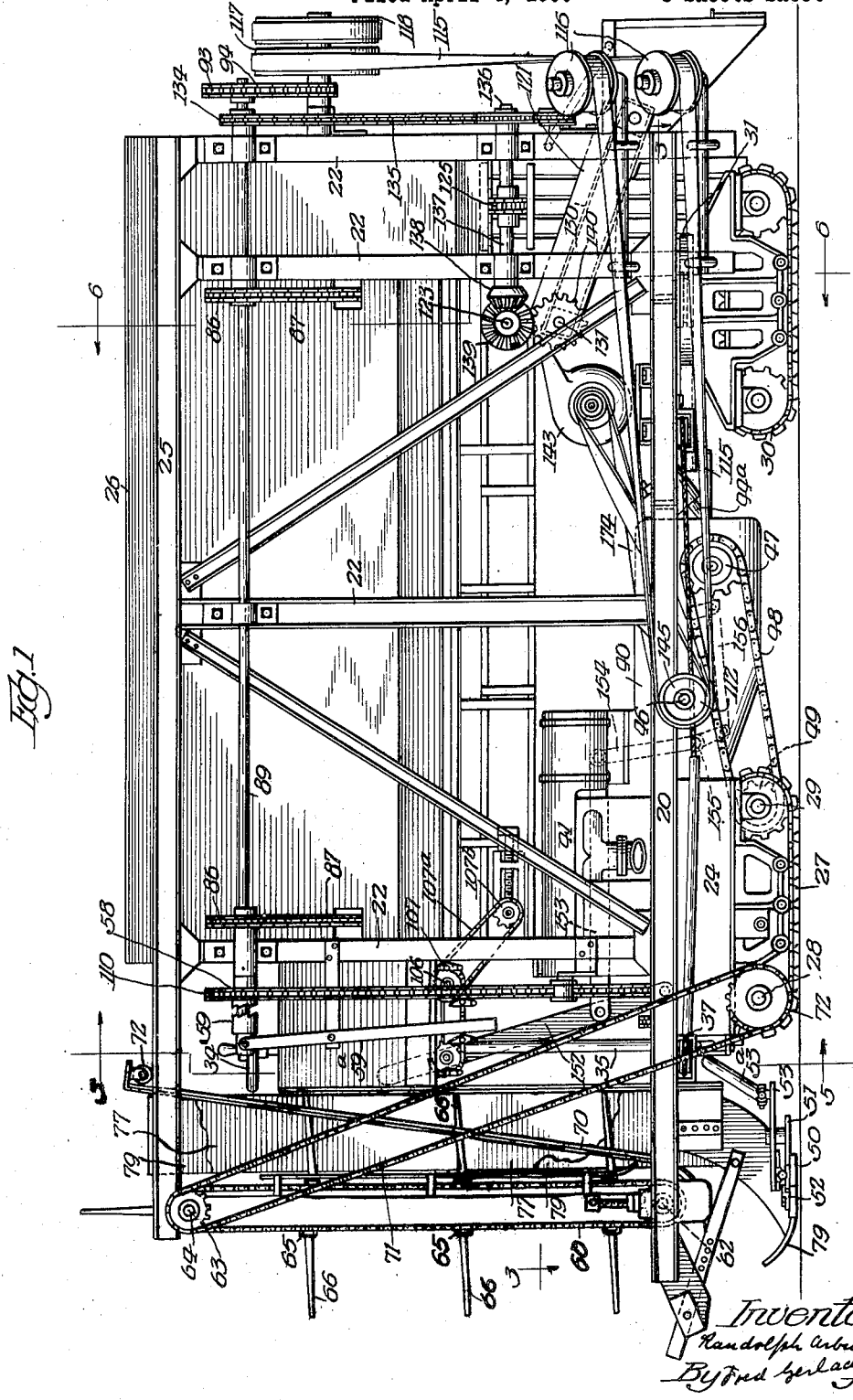

April 14, 1936.  R. ARBUCKLE  2,037,300
COMBINED PEA HARVESTER AND HULLER
Filed April 4, 1935  5 Sheets-Sheet 1

April 14, 1936.  R. ARBUCKLE  2,037,300
COMBINED PEA HARVESTER AND HULLER
Filed April 4, 1935  5 Sheets-Sheet 2

April 14, 1936.  R. ARBUCKLE  2,037,300
COMBINED PEA HARVESTER AND HULLER
Filed April 4, 1935  5 Sheets-Sheet 3

Inventor
Randolph Arbuckle
By Fred Walach Atty

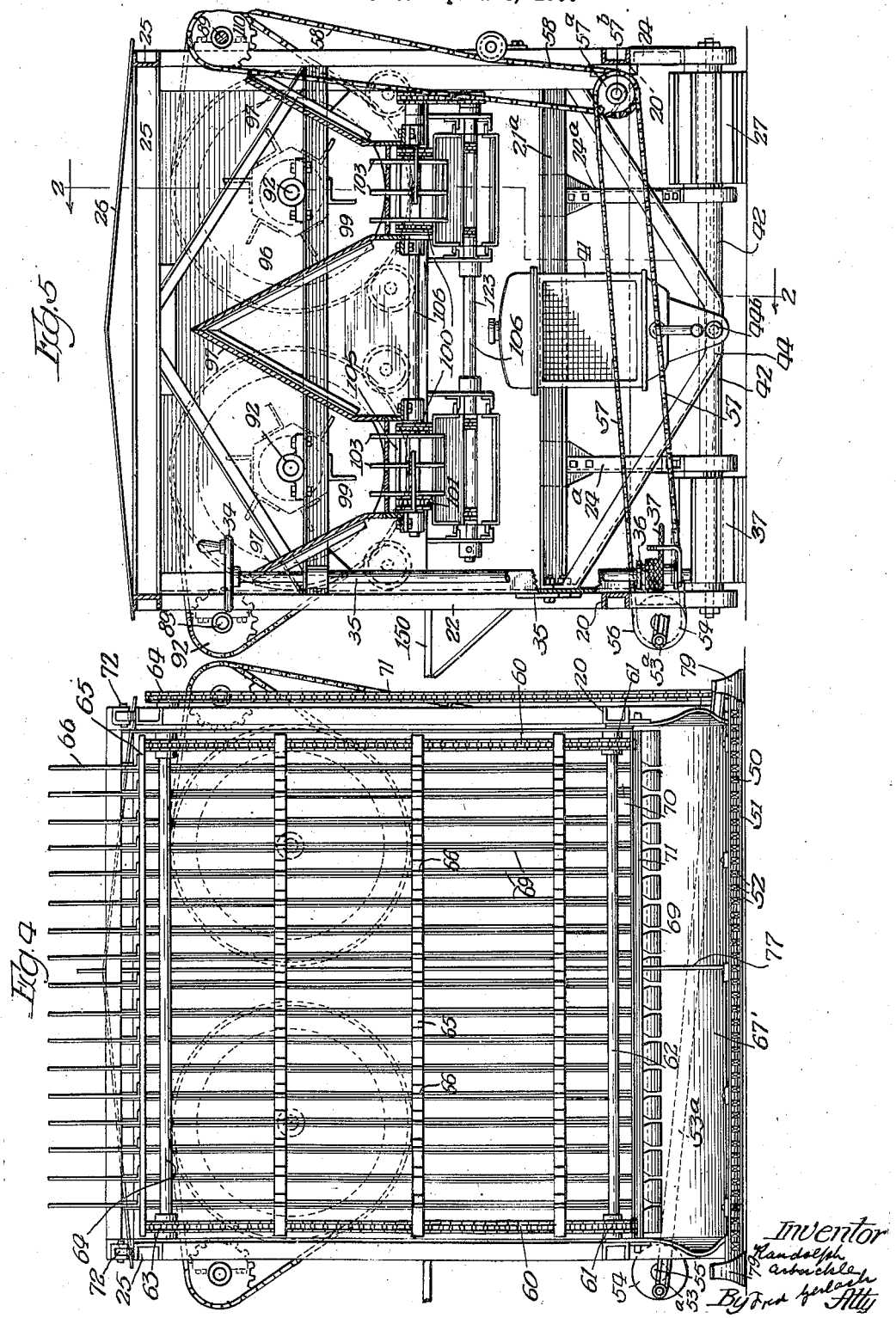

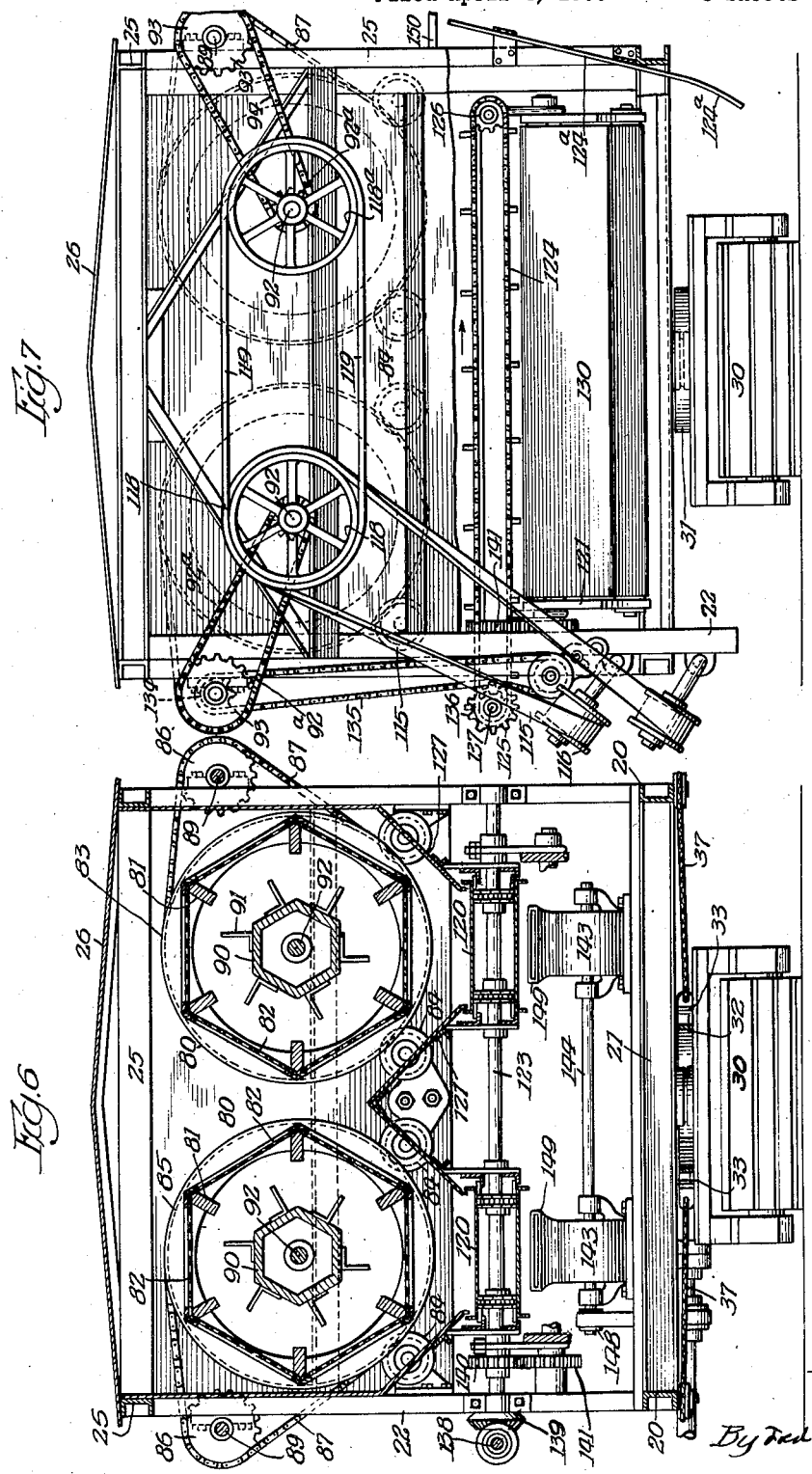

Patented Apr. 14, 1936

2,037,300

UNITED STATES PATENT OFFICE 2,037,300

COMBINED PEA HARVESTER AND HULLER

Randolph Arbuckle, Geneseo, Ill., assignor to The Beardsley & Piper Company, Chicago, Ill., a corporation of Illinois Application April 4, 1935, Serial No. 14,563

20 Claims. (Cl. 56—20)

The invention relates to combined pea harvesters and hullers.

One object of the invention is to provide an improved machine for cutting the standing vines and hulling the peas while the machine traverses the field, delivering the vines and hulls back onto the field and separately retaining the shelled peas for canning. By depositing the vines, shells and chaff back onto the field from whence they came they can be ploughed under for fertilizer, if desired, or cured for hay and used as stock food, without transportation costs to and from the huller or cannery.

Another object of the invention is to provide an improved machine of this character by which the standing vines are cut and then delivered to the huller without being packed or matted together, such as occurs when they are loaded on wagons in transit from the field to the huller, and so that the hulling operation will be facilitated.

Another object of the invention is to provide a combined harvesting and hulling machine which is adapted to be driven over the field and which is equipped with a plurality of hulling drums to give the machine sufficient capacity to quickly harvest and hull the peas in a field, which is an important factor when the harvesting must be done in a comparatively short period.

Another object of the invention is to provide a combined harvesting and hulling machine which is adapted to be driven by a tractor of standard construction from which the ground wheels have been removed. This permits the tractor to be used on the machine and also separately used during the seasons of the year when no pea harvesting is done.

Another object of the invention is to provide a combined harvester and huller for peas, which is efficient in operation.

Other objects of the invention will appear from the detailed description.

The invention consists in the several novel features hereinafter set forth and more particularly defined by claims at the conclusion hereof.

Figure 2:
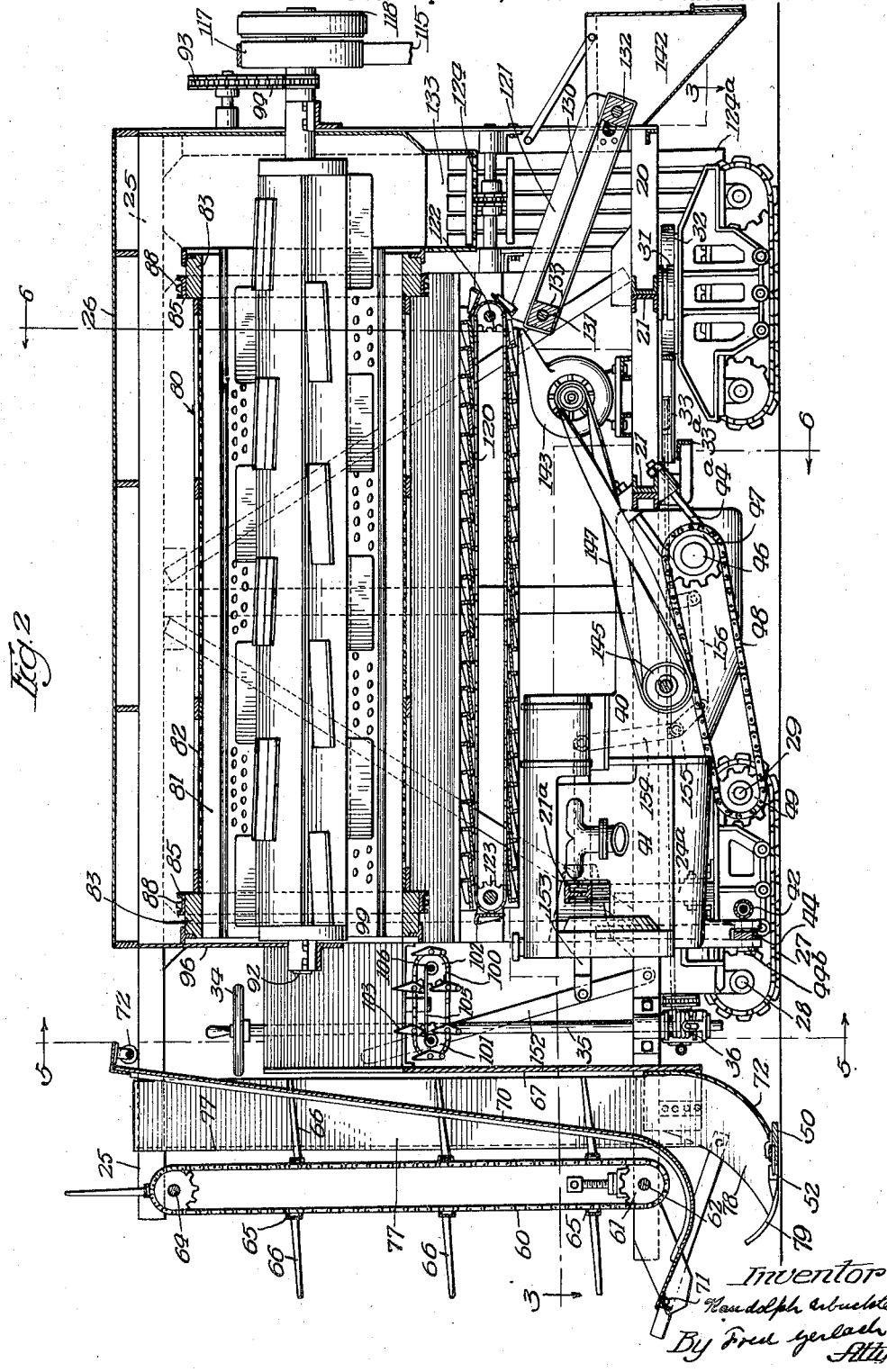
Figure 3:
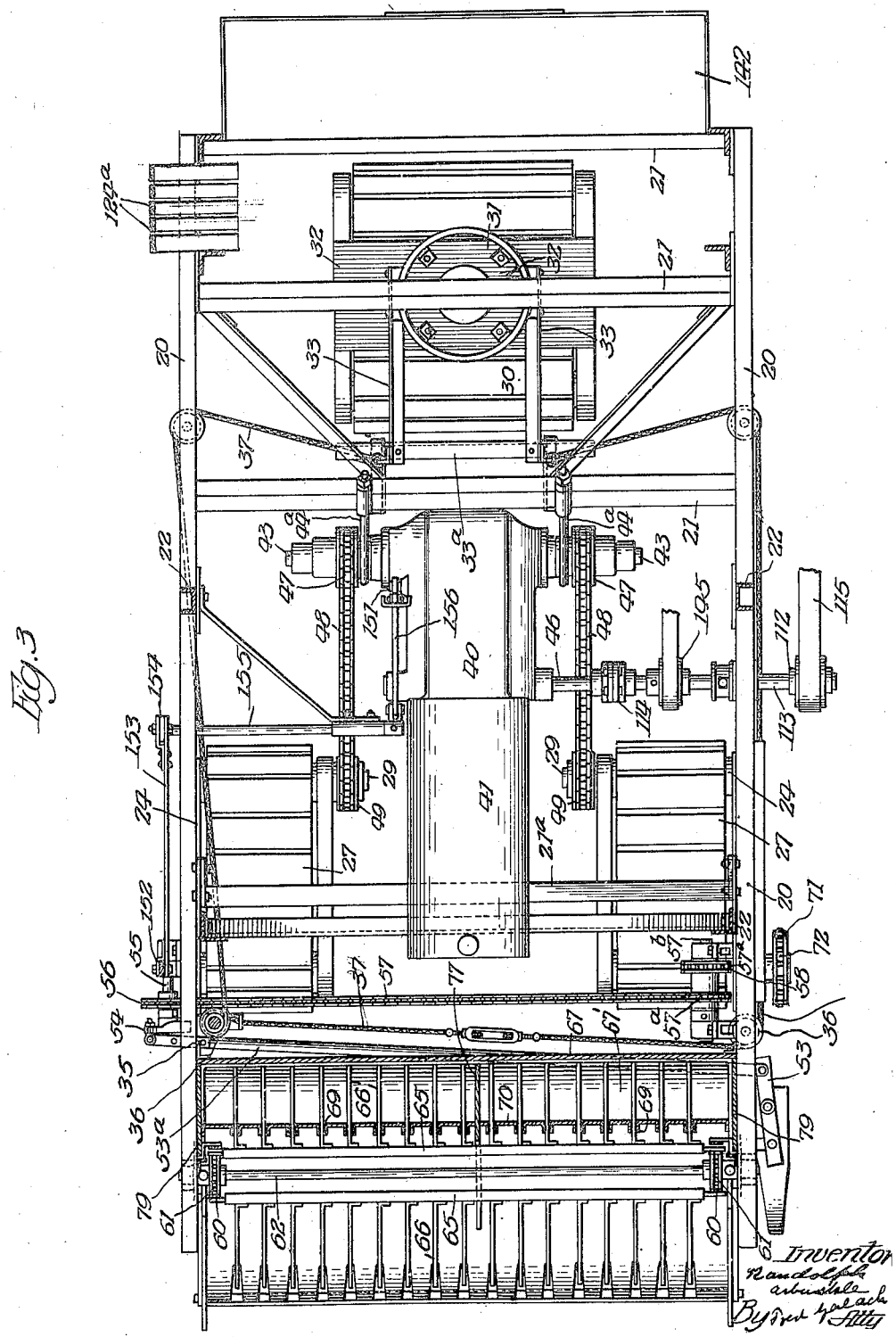

In the drawings:

Fig. 1 is a side elevation of a machine embodying the invention. Fig. 2 is a longitudinal section on line 2—2 of Fig. 5. Fig. 3 is a horizontal section on line 3—3 of Fig. 2. Fig. 4 is a front elevation. Fig. 5 is a transverse section on line 5—5 of Fig. 2. Fig. 6 is a transverse section on line 6—6 of Fig. 2. Fig. 7 is a rear elevation.

The invention is exemplified in a machine comprising a harvester or cutter extending across the front thereof for severing the standing vines from the roots in close proximity to the ground; an elevator for the cut vines which lifts them by means of suitable raking fingers which avoid matting or tangling the vines; a hopper which receives the vines from the elevator; a pair of longitudinally extending huller drums into which the vines are delivered and whereby they are threshed so that the shelled peas will be discharged therefrom; a conveyor for delivering the vines from the huller back onto the field; means for cleaning the shelled peas before they are delivered into a suitable receiver; a suitable supporting structure which is adapted to be propelled over the field and is supported by creeper units; and a tractor which is adapted to be mounted on the supporting structure to propel the machine and drive the operating parts when the ground wheels have been removed from the tractor.

The supporting frame comprises longitudinal beams or sills 20 at the sides of the machine, cross-beams 21 fixedly secured and extending between said beams 20, standards 22 fixedly secured to the beams 20, upper longitudinal beams or sills 25 fixedly secured to the upper ends of said standards, and a roof 26. All of these parts are rigidly secured together to form a rigid supporting structure. This frame is supported at its front by a pair of creeper or caterpillar units 27 disposed adjacent the sides of the supporting structure, and of any suitable construction. Each unit 27 comprises an endless series of pivotally connected shoes, front and rear sprockets around which the series of shoes pass, a transverse shaft 28 for the front sprockets, a transverse shaft 29 for the rear sprockets, and suitable side frames carrying rollers for guiding the shoes between the sprockets, as well understood in the art. The front of the supporting frame is supported by brackets 24 between the outer side-frames of the creeper-units and sills 20 and brackets 24ª between the inner side-frames of the creeper-unit and a cross-beam 21ª. The rear is supported by a dirigible creeper-unit 30 of similar construction, through a turntable 31 between one of the cross-beams 21 and a plate 32 which rigidly connects the side-frames of this unit 30. Bars 33 fixed to plate 32, the front ends of which move over a fixed cross-bar 33ª, constitute a steering fork whereby the rear unit 30 may be turned to steer the machine around the field. A steering wheel 34 near the top of and at one side of the frame is fixed to the upper end of a vertical shaft 35 which is journaled in suitable bearings in the supporting frame. The lower end of shaft 35 is provided with a drum 36 for a steering cable 37 which is guided by sheaves and connected to the bars 33 of the steering fork, to turn the rear creeper-units 30. This construction exemplifies a supporting frame carried by creeper-units and which is adapted to be steered around the field. The creeper-units adapt the machine for work in wet fields where frequently, on account of the short harvesting period, it is necessary to expedite the harvesting and hulling of the peas.

The invention contemplates mounting an ordinary tractor on the supporting frame, for propelling the machine and driving the mechanisms carried thereby. The tractor illustrated comprises the usual transmission housing 40 which carries an internal combustion engine 41, transmission gearing and a differential contained in said housing, and rear driven axles 43 driven through a differential, as well understood in the art. A tubular beam 42 extends between the side-frames of the front creeper-units.

The front portion of the tractor is supported, and demountably secured, by a pin 44$^b$ to beam 44 which extends under the engine to standards of the supporting frame. The rear portion of the tractor-frame 40 is demountably supported from one of the cross-beams 21 by U-clamps 44$^a$ which fit around sleeves on said frame in which the rear axles 43 are journaled and are removably secured to said cross-beam. Cross-beam 21$^a$ extends through a space between the engine and its hood and is bolted at its ends to standards 22 so that it can be removed when removing and replacing the tractor. Power for driving the front creeper-units to propel the machine is taken from the rear axles 43. Sprockets 47 are demountably secured to axles 43 respectively, and each of these sprockets drives a chain 48. Each chain 48 drives a sprocket 49 on the shaft 29 of one of the front creeper-units so that the machine will be propelled by power from the rear tractor axles. The engine is equipped with the usual engine-driven power take-off shaft 46, which is used to drive, through a demountable connection, the hulling mechanism, as hereinafter described.

When the tractor has been separately used and is to be applied to the machine for work in the field, the rear wheels and the front steering wheel, with which the tractor is usually equipped, are first removed. Cross-beam 21$^a$ is removed from the supporting frame of the machine. The front of the tractor is then secured by pin 44$^b$ to beam 44 and housing 40 is secured to the supporting frame by U-clamps 41$^a$. Sprockets 47 are then secured to the outer ends of the axles 43 and connected by chains 48 to the drive sprockets 49 for the front creeper-units. Beam 21$^a$ is then replaced on the supporting frame. When the machine has completed its work in the field and it is desired to use the tractor independently, it can be removed by disconnecting it from the frame at pin 44$^b$ and clamps 44$^a$ after the sprocket chains 48 and sprockets 47 have been removed from axles 43. The traction and steering wheels may then be replaced on the tractor so that it will be useable for other purposes while the harvesting machine is not in use. This exemplifies a combined harvester and huller with a power unit which makes it possible to utilize the tractor for independent use when the combined harvester and huller is idle.

Cutting mechanism for severing the standing pea vines from their stems or stalks is provided at the front of the machine and travels in advance of the machine. This mechanism comprises a guide-bar 50 fixedly supported from the frame-work of the machine, a cutter-bar 51 with V-shaped knives reciprocable in the bar 50 and forwardly projecting fingers 52 to direct the stalks to the knives. This cutting mechanism extends across the entire front of the machine to cut a swath substantially equal to the width of and in advance of the machine so that in traversing the field, the machine will travel on ground from which the vines have been cut and removed. Mechanism for reciprocating the cutter-bar comprises a rocker-lever 53 connected to cutter-bar 51 and a link 53$^a$ connected to the lever 53 and to a crank-disk 54. Said crank-disk is mounted on a shaft 55, which is carried in bearings fixed to the supporting frame, and is driven by a sprocket 56 on said shaft, a chain 57, which drives said sprocket and is driven by a sprocket wheel 57$^a$ on a shaft 57$^b$, a chain 58, which drives sprocket 57$^c$ on shaft 57$^b$ and is driven by a sprocket 110 on a shaft 89, which is driven as hereinafter set forth. A clutch 59 (Fig. 1) between shaft 89 and sprocket 110, which is controllable by a lever 59$^a$, permits the operator to stop the drive mechanism for the cutting mechanism when the machine is being moved over the field for transportation only.

An elevator for the cut vines comprises vertically extending endless chains 60, the lower portions of which pass around idler sprockets 61 on a cross-shaft 62, and the upper portions of which pass around drive sprockets 63 on a cross-shaft 64. A spaced series of cross-bars 65 are fixed to the links of chains 60, and a series of raking or carrying fingers 66 are fixed to said bars. In their upward movement, the fingers 66 pass through and travel in slots 69 in a stripper-plate 70. A stationary vertical wall 67 is disposed rearwardly of the stripper-plate 70 and the fingers 66. The portions of the fingers which project through the stripper-plate, in coaction with wall 67, carry the vines upwardly. The lower portion of stripper-plate 70 is curved under the sprockets 61 and secured to a transverse angle-iron 71 which is pivotally supported in the supporting frame, so the plate can yield responsively to the quantity of vines being elevated. The upper end of the stripper-plate is provided with rollers 72 adapted to rest on the upper longitudinal beams 25 of the supporting frame to limit the rearward movement of the stripper-plate while permitting it to be pushed forwardly by the vines between the stripper-plate and wall 67. This causes the vines to be pressed rearwardly off the fingers 66 and over the top of wall 67. A curved wall 72 extends from finger bar 50 upwardly to the vertical wall 67 to coact with the fingers 66 in starting the vines engaged by the fingers upwardly between wall 67 and stripper-plate 70. In operation the fingers, as they travel around the lower cross-shaft 62, are swung backwardly through slot 70 in the stripper-plate, so they will pass in close proximity to the cutter mechanism, engage the vines, and sweep them over the curved wall 72 into the space between fixed wall 67 and the pivoted stripper-plate. Thereafter, during their ascent the fingers will carry the vines upwardly until they are released from the fingers by the stripper-plate and discharged rearwardly over the back wall 67.

The endless chains 60, which carry the elevating fingers 66, are driven in proportion to the speed of travel of the machine over the field. For this purpose the drive shaft 64 for sprocket 63 is driven by a sprocket chain 71 which is driven by a sprocket 72 which is fixed to the sprocket shaft 28 of one of the front creeper-units. As a result, the elevator fingers will be operated according to the speed of travel of the machine over the ground.

This construction exemplifies means for raking or sweeping the cut vines from the cutting mechanism into an elevator for delivery to the hullers and in which the vines are elevated by fingers which will not cause them to become matted or packed and also means for stripping the vines from the fingers, which is yieldingly supported to permit varying quantities of vines to be efficiently elevated and discharged from the elevator to the hulling mechanism.

The invention contemplates cutting and elevating mechanisms for harvesting a swath of sufficient width to supply a plurality of hullers. In order to divide the vines so that they can be readily fed to the hullers a central partition 77 is formed in the elevator leg. The lower end of this partition terminates in a dividing finger 78. Dividers 79 are also provided at the sides of the elevator leg. This construction results in elevating two separate columns of vines for separate delivery to the hullers, as hereinafter set forth.

A pair of longitudinally extending hullers are supported in the upper portion of the supporting frame of the machine. These hullers are arranged side by side and extend longitudinally of the machine over the tractor. Each huller comprises an outer drum 80 which comprises longitudinal elevating bars or ribs 81 and a suitable perforated peripheral wall 82 through which shelled peas can pass, and heads 83 at the ends of the drums. These heads are provided with channel-bar rings 85 which are supported on rollers 84. Each outer drum 80 is driven by sprocket wheel 86 and chain 87 which pass around sprocket teeth 88 in the channels of the rings 85. Sprocket wheel 86 at the front and rear ends of each drum 80 are fixed to and driven by longitudinal shafts 89. Each huller also comprises an inner hexagonal drum 90 which is provided with beaters and feed vanes 91 which are suitably inclined to move the vines longitudinally through the drum. Each inner drum is fixed to a shaft 92. Each longitudinal shaft 89 is driven by a sprocket wheel 92ª on one of the shafts 92, a sprocket chain 94 and a sprocket wheel 93 fixed to one of the shafts 89. The front ends of drums 80 are closed by a stationary partition 96 which, near its lower end, is provided with openings 99 through which the vines enter the drums 80. Two hoppers 97 (Fig. 5) are provided between partition 96 and wall 67 and receive the vines from the elevator.

Conveyors are provided for delivering the vines from the lower ends of the hoppers 97 through openings 99 in partition 96, into the drums 80 respectively. Each of these conveyors comprises a pair of endless chains 100, front idler sprockets 101, rear driven sprockets 102 and a series of fingers 103 which are fixed to rods 104, which are pivotally mounted on the chains. These fingers pass upwardly through slots in the bottom of the chute 97 and are guided by a track 105 while they traverse the upper reach of the chains to project through the slots and remain vertical and feed the vines rearwardly into the front of the drums. A common shaft 106 (Fig. 5) for the drive sprockets 102 of both of the feed conveyor chains 100 is driven (Fig. 1) by a sprocket wheel 107 fixed to said shaft, a chain 107ª, and a sprocket 107ᵇ on one of the shafts of the pea-conveyor hereinafter described.

The hulling and harvesting mechanisms are driven by a pulley 112 which is fixed to an extension shaft 113 that is secured by a detachable coupling 114 to the power take-off shaft 46 of the tractor. Pulley 112 drives a belt 115 which is guided by sheaves 116 to drive a pulley 117 on the shaft 92 of one of the beater drums 90. The second beater drum 90 is driven from a pulley 118 fixed to revolve with pulley 117 by a belt 119 and a pulley 118ª.

The shelled peas pass through the perforations in the peripheries of drums 80, which are usually formed of elastic material to prevent the peas from being broken. A slatted endless pea-conveyor 120 extends longitudinally of and under each of the drums 80, the peas being directed to the conveyors by inclined fixed walls 121. The chains of each conveyor 120 pass around rear drive sprockets 122, and front sprockets 123, which are suitably mounted in the frame-work of the machine. The pea-conveyors 120 are driven by power imparted to a common shaft 123 for their rear sprockets 122. Shaft 123 is driven (Fig. 1) from one of the shafts 89 by a sprocket 134 fixed to said shaft 89, a chain 135, a sprocket 136 on a counter-shaft 137 which is mounted on one side of the supporting frame, a beveled gear 138 fixed to shaft 137, and a gear 139 meshing with gear 138 and fixed on shaft 123. The shelled peas are discharged from the rear of each conveyor 120 onto an inclined endless conveyor belt 130 which is carried by polygonal rolls 131 and 132 which will vibrate the belt.

The threshed vines are discharged from the rear open end of the drums 80 into a transverse trough 133. A transverse endless conveyor 124 has slats which travel over the bottom of the trough to deliver the threshed vines back onto the portion of the field from which the peas have been previously cut, where it may be allowed to remain and cure for use as hay or fodder. The chain of this conveyor 124 passes around, and is driven by, a sprocket 125 fixed to driven shaft 137 and passes around an idler sprocket 126. The threshed vines as they pass off the conveyor 124 are arrested by the slats 124ª and deflected under the machine and onto the ground so they will not be deposited onto the uncut vines at the side of the machine.

Endless belt conveyor 130 is driven by a gear 140 fixed to the shaft 123 of the pea-conveyor 120 and a gear 141 fixed to the roll 131 of conveyor 130. The upper reach of the belt of the conveyor 130 is driven to travel forwardly and upwardly to retard the descent of the peas. From conveyor 130 the shelled peas drop into a suitable hopper or container 142, from which they can be unloaded into suitable receptacles for transportation to the cannery.

Blowers 143 are provided to blow the chaff from the shelled peas as they drop from each of the conveyors 120 onto the conveyors 130. The common shaft 144 of these blowers is driven from a pulley 145 on the extension 113 of power take-off shaft 43 of the tractor by a belt 147 driven by said pulley and a pulley 148 on the blower shaft. The discharge nozzle 149 of each blower 143 is extended to direct the blast between conveyors 120 and 138 to clean the peas and blow any chaff away. A platform 150 is supported at one side of the machine on which the operator may stand where the steering wheel is accessible to him so that the machine may be steered around the field.

In operation, the operator on the platform 150 can operate the steering wheel 34 to turn the rear creeper-unit to direct the machine to or around the field. When the machine reaches the stand of peas, the operator will couple the clutch 59 by the manipulation of lever 59ª to cause the sickle to be driven from one of the shafts 89 and will couple the power take-off shaft 46 so it will be driven by the motor. All of the harvesting, elevating and hulling mechanisms will then be driven as the machine is propelled over the field. The front creeper-units of the machine will be driven from the differential-driven axles 43 of the tractor, under control of the transmssion gearing usually provided. The controlling lever 151 for the transmission in housing 40 is operatively connected to a hand lever 152 within reach of the operator on platform 150 so that the operator can conveniently control the travel of the machine. Lever 152 is connected by a link 153 to an arm 154 on a rock shaft 155 which is connected by a link 156 to the usual gear shaft arm 151.

As the machine travels into the stand of peas, the sickle will cut a swath of vines fully equal to the width of the machine. The cut vines will be caught by the fingers 66 and raked or swept over the curved wall 72 into the space between wall 67 and the stripper-plate 70. The yielding slotted stripper-plate 72 will coact with the fingers 66 in guiding the vines upwardly. As the vines reach the upper end of the leg, the stripper-plate will force the vines rearwardy off the fingers 66 and discharge them over the upper end of wall 67 into the respective hoppers 97. The divider 78 will separate the vines at the center of the cut so that a portion of each cut will be delivered into the respective hopper 97. The fingers 103 of conveyors 100 will feed the vines through openings 99 into the front ends of the drums 80 which will slowly elevate them while the beater drums 90 will thresh the vines to open the hulls and permit the peas to escape through the perforated peripheries 82 of the drums 80. While the vines are in transit to the rear end of the drums, the shelled peas will drop through the perforations in the peripheries 82 of the drums 80 and onto the pea conveyors 120. In passing off the rear ends of the conveyors 120 the peas will be subjected to blasts of air from the blowers 143 to remove the chaff adhering to them. The cleaned shelled peas will drop off the rear end of the conveyor 130 and into the receiver 142. The vines and hulls will be discharged from the rear ends of the drums 80 onto the cross-conveyor 124 and conveyed transversely to one side of the machine where they will be thrown back onto the field.

The invention exemplifies a combined pea harvesting and hulling machine which has a great capacity so that the harvesting can be expedited and carried on within the limited periods frequently available for that purpose. The elevator and harvester at the front of the machine are adapted to operate in advance thereof so the traction elements travel over the ground from which the peas have been cut. The elevator mechanism for the cut vines is organized to elevate the vines without entangling or matting them so that the hulling operation will not be retarded. The machine is adapted for the demountable use of a tractor from which traction and carrying wheels have been removed so that a tractor available for other purposes can be utilized during the limited periods during which the machine is used each season. The elevating mechanism which delivers the vines to the hullers is driven by power derived from one of the traction or creeper units so that the elevator will be operated at a speed corresponding to the speed at which the machine is propelled over the ground. The other power driven mechanisms of the machine are all driven by power derived from the usual power take-off shaft of a tractor.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In a combined pea harvesting and hulling machine, the combination of a carriage, a power plant mounted on the carriage, propelling means operable by the power plant, cutter mechanism extending across the front of the carriage, means for elevating the cut vines from the cutting mechanism, a huller comprising a cylinder extending longitudinally of the carriage, means for delivering the vines discharged from the elevating means into the front end of the cylinder, means for receiving the shelled peas from the huller, and power means for driving the huller.

2. In a combined pea harvesting and hulling machine, the combination of a supporting frame and carriage, a power plant mounted on the carriage, cutter mechanism extending across the front of the carriage, a curved transverse plate extending rearwardly and upwardly from the cutter-mechanism, means for elevating the cut vines from the cutting mechanism and sweeping them over said plate, a huller comprising a cylinder extending longitudinally of the carriage, means for delivering the vines from the elevating means into the front end of the cylinder, and means for receiving the shelled peas from the huller.

3. In a combined pea harvesting and hulling machine, the combination of a supporting frame and carriage, a power plant mounted on the carriage, cutter mechanism extending across the front of the carriage, a curved transverse plate extending rearwardly and upwardly from the cutter mechanism, a vertical wall extending upwardly from the plate, means for elevating the cut vines from the cutting mechanism and sweeping them over said plate, a huller comprising a cylinder extending longitudinally of the carriage, means for delivering the vines from the elevating means into the front end of the cylinder, and means for receiving the shelled peas from the huller.

4. In a combined pea harvesting and hulling machine, the combination of a carriage, a power plant mounted on the carriage, propelling means for the carriage, cutter mechanism extending across the front of the carriage, elevating means for the cut vines extending upwardly from the cutting mechanism comprising a vertically travelling series of fingers adapted to lift the vines, a huller comprising a cylinder extending longitudinally of the carriage, and means for delivering the vines from the fingers into the front end of the cylinder.

5. In a combined pea harvesting and hulling machine, the combination of a carriage, a power plant mounted on the carriage, propelling means for the carriage, cutter mechanism extending across the front of the carriage, elevating means for the cut vines extending upwardly from the cutting mechanism comprising a vertically travelling series of fingers adapted to lift the vines, means for stripping the vines from the fingers, a huller comprising a cylinder extending longitudinally of the carriage, and means for delivering the vines from the fingers into the front end of the cylinder.

6. In a combined pea harvesting and hulling machine, the combination of a carriage, a power plant mounted on the carriage, cutter mechanism extending across the front of the carriage, elevating means for the cut vines extending upwardly from the cutting mechanism comprising a vertically movable series of fingers adapted to lift the vines and an endless element for operating the fingers, a huller comprising a cylinder extending longitudinally of the carriage, and means for delivering the vines from the fingers into the front end of the cylinder.

7. In a combined pea harvesting and hulling machine, the combination of a carriage, a power plant mounted on the carriage, cutter-mechanism extending across the front of the carriage, means for elevating the cut vines from the cutting mechanism, comprising an endless element and a series of raking fingers carried by said element, a transverse vertically extending wall rearwardly of the fingers, vertically extending resilient means for stripping the vines from the fingers and pressing them towards said wall, a huller comprising a cylinder extending longitudinally of the carriage, means for delivering the vines from the elevating means into the front end of the cylinder, and means on the carriage for receiving the shelled peas from the huller.

8. In a combined pea harvesting and hulling machine, the combination of a carriage, a power plant mounted on the carriage, cutter-mechanism extending across the front of the carriage, means for elevating the cut vines from the cutting mechanism, comprising an endless element and a series of raking fingers carried by said element, a transverse vertically extending wall rearwardly of the fingers, vertically extending resilient means for stripping the vines from the fingers and pressing them towards said wall, a transverse curved guide extending from the cutting mechanism to the wall, a huller comprising a cylinder extending longitudinally of the carriage, means for delivering the vines from the elevating means into the front end of the cylinder, and means on the carriage for receiving the shelled peas from the huller.

9. In a combined pea harvesting and hulling machine, the combination of a carriage, a power plant mounted on the carriage, cutter mechanism extending across the front of the carriage, means for elevating the cut vines from the cutting mechanism comprising an endless element and a series of raking fingers carried by said element, a transverse vertically extending wall rearwardly of the fingers, a vertically extending movable slotted plate for stripping the vines from the fingers and pressing them towards said wall, a huller comprising a cylinder extending longitudinally of the carriage, means for delivering the vines from the elevating means into the front end of the cylinder, and means for receiving the shelled peas from the huller.

10. In a combined pea harvesting and hulling machine, the combination of a carriage, a power plant mounted on the carriage, mechanism operable by the power plant for propelling the carriage, cutter mechanism extending across the front of the carriage, a plurality of hullers each comprising a cylinder extending longitudinally of the carriage, means for delivering the vines from the cutter mechanism into the front end of the cylinders, and mechanism for driving the delivery means and the hullers from the power plant.

11. In a combined pea harvesting and hulling machine, the combination of a carriage, a power plant mounted on the carriage, mechanism operable by the power plant for propelling the carriage, cutter mechanism extending across the front of the carriage, a plurality of hullers each comprising a cylinder extending longitudinally of the carriage, and means for delivering separate streams of vines from the cutter-mechanism into the front end of the cylinders.

12. In a combined pea harvesting and hulling machine, the combination of a carriage, a power plant mounted on the carriage, mechanism operable by the power plant for propelling the carriage, cutter-mechanism extending across the front of the carriage, a plurality of hullers, each comprising a cylinder extending longitudinally of the carriage, means for delivering the vines from the cutter mechanism into the front end of the cylinders, pea-conveyors under the cylinders, and mechanism for driving the cylinders, the delivery means, the pea-conveyors and the cutter mechanism from the power plant.

13. In a combined pea harvesting and hulling machine, the combination of a carriage, cutter-mechanism extending across the front of the carriage, a huller comprising a cylinder extending longitudinally of the carriage, a tractor demountably secured on the carriage and comprising rear axles and a power take-off shaft, mechanism driven by the rear axles for propelling the carriage, and mechanism for operating the huller from the power take-off shaft.

14. In a combined pea harvesting and hulling machine, the combination of a carriage, cutter-mechanism extending across the front of the carriage, a huller comprising a cylinder extending longitudinally of the carriage, a tractor demountably secured on the carriage and comprising rear axles and a power take-off shaft, mechanism driven by the rear axles for propelling the carriage and operating the cutting mechanism, and mechanism for operating the huller driven from the power take-off shaft.

15. In a combined pea harvesting and hulling machine, the combination of a carriage, cutter-mechanism extending across the front of the carriage, an elevator for lifting the cut vines from the cutting-mechanism, a huller comprising a cylinder extending longitudinally of the carriage, means for delivering the vines from the elevator into the front end of the huller, a tractor demountably secured on the carriage and comprising rear axles and a power take-off shaft, mechanism driven by the axles for propelling the carriage, mechanism for driving the huller and the elevator from the power take-off shaft, and mechanism for driving the cutting mechanism from the propelling mechanism.

16. In a combined pea harvesting and hulling machine, the combination of a carriage, cutter-mechanism extending across the front of the carriage, a huller comprising a cylinder extending longitudinally of the carriage, means for delivering the vines from the elevator into the front end of the huller, a tractor demountably secured on the carriage and comprising rear axles and a power take-off shaft, mechanism driven by the axles for propelling the carriage, and mechanism for driving the huller from the power take-off shaft comprising a shaft mounted on the carriage detachably connected to the power take-off shaft.

17. In a combined pea harvesting and hulling machine, the combination of a carriage, cutter-mechanism extending across the front of the carriage, a huller comprising a cylinder extending longitudinally of the carriage, means for delivering the vines into the front end of the huller, a tractor demountably secured on the carriage and comprising rear axles and a power take-off shaft, mechanism driven by the axles for propelling the carriage, mechanism for driving the huller from the power take-off shaft, a blower, and mechanism for driving the blower from said power shaft.

18. In a combined pea harvesting and hulling machine, the combination of a carriage, a power plant mounted on the carriage, cutter-mechanism extending across the front of the carriage, an elevator for lifting the cut vines from the cutting-mechanism, a huller comprising a cylinder extending longitudinally of the carriage, a hopper for receiving the vines from the elevator, and a conveyor for delivering the vines into the front end of the cylinder.

19. In a combined pea harvesting and hulling machine, the combination of a carriage, a power plant mounted on the carriage, cutter-mechanism extending across the front of the carriage, means for elevating the cut vines from the cutting-mechanism, a huller comprising a cylinder extending longitudinally of the carriage, means for delivering the vines from the elevator into the front end of the huller, an endless conveyor for receiving the shelled peas from the huller, a conveyor onto which the shelled peas are delivered by the first mentioned conveyor, and a blower for delivering a cleaning blast to the peas between said conveyors.

20. In a combined pea harvesting and hulling machine, the combination of a carriage, creepers for the carriage, cutter-mechanism extending across the front of the carriage, a huller comprising a cylinder extending longitudinally of the carriage, a tractor demountably secured on the carriage and comprising rear axles, and a power take-off shaft, mechanisms driven by the rear axles for driving the creepers to propel the carriage, and mechanism for operating the huller and the cutting-mechanism driven from the power take-off shaft.

RANDOLPH ARBUCKLE.